Oct. 20, 1959 — C. L. DUESLING — 2,909,283
MINERAL CONCENTRATING AND SEPARATING APPARATUS
Filed Jan. 23, 1957 — 2 Sheets-Sheet 1
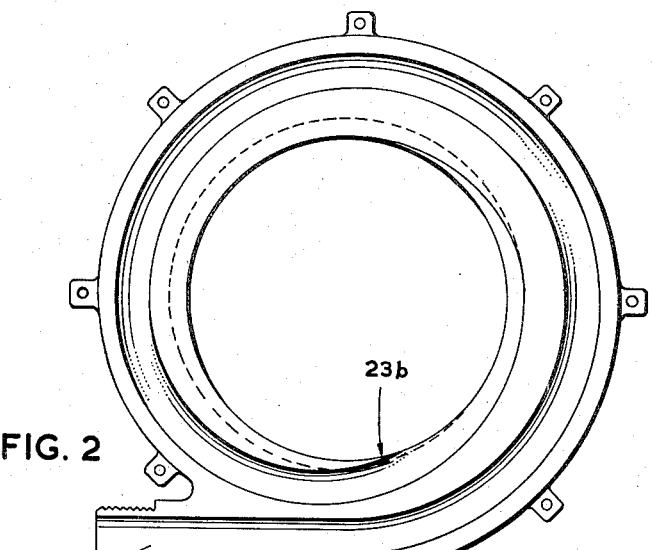
FIG. 2
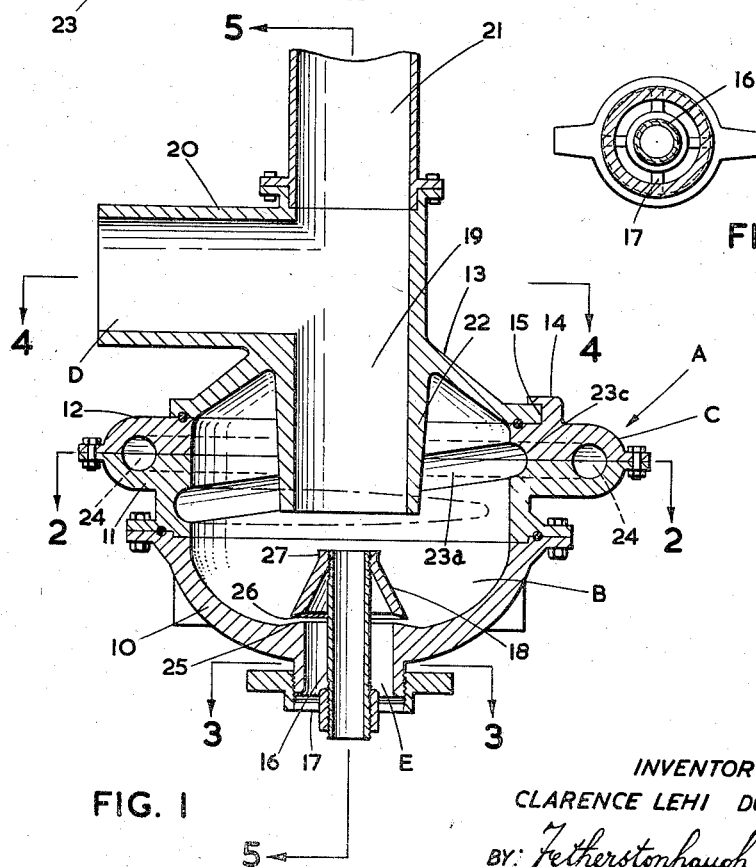
FIG. 3
FIG. 1
INVENTOR
CLARENCE LEHI DUESLING
BY: Fetherstonhaugh & Co
ATTORNEYS Oct. 20, 1959  C. L. DUESLING  2,909,283
MINERAL CONCENTRATING AND SEPARATING APPARATUS
Filed Jan. 23, 1957  2 Sheets-Sheet 2

INVENTOR
CLARENCE LEHI DUESLING
BY: *Fetherstonhaugh & Co*
ATTORNEYS

United States Patent Office 2,909,283
Patented Oct. 20, 1959

2,909,283

MINERAL CONCENTRATING AND SEPARATING APPARATUS

Clarence Lehi Duesling, London, Ontario, Canada, assignor to Ferros Metals Research Co. Limited, Toronto, Ontario, Canada, a corporation of the Province of Ontario, Canada Application January 23, 1957, Serial No. 635,702

12 Claims. (Cl. 209—211)

This invention relates to improvements in mineral concentrating and separating apparatus.

Mineral concentrating and separating apparatus employing centrifugal force for separation purposes have been well known and have operated to separate mineral content of the material from the sludge in this general manner. The yield, however, has not been all that could be desired and this has been occasioned to some degree by the fact that excessive turbulence in some phases of operation such as in the path of tangential injection has largely affected degree of separation which results in excessive loss of mineral in the contents. The present invention largely avoids these difficulties of the past and provides for a pre-concentration of mineral in the feeding zone, eliminates excessive turbulence to permit preliminary separation of sludge and permits a finer degree of separation in stages of operation building from the pre-concentrate.

The present invention will be described in relation to the separation of iron ore but it will be understood that the apparatus will apply to all minerals capable of being separated in this manner.

The invention generally comprises apparatus embodying a concentrating chamber of generally circular cross-section having a tailings discharge outlet in the top thereof and a concentrating discharge outlet in the bottom thereof, axially aligned with one another, an injector for discharging mineral containing sludge into the chamber, a vortex air inlet tube disposed in the concentrate discharge outlet and extending into the chamber, a concentrate separating head disposed above said concentrate discharge outlet and surrounding said air inlet tube, said head being spaced from the bottom of said chamber to form a passage therebetween leading to said concentrate discharge outlet, the separating head being formed with a splitting edge adjacent said passage for separating the concentrate from said sludge as the former moves into said passage. In addition, a salient feature of construction embodies an injector having a spirally disposed passage for introducing mineral containing sludge into the chamber in a substantially circular path within said chamber wherein an initial part of the passage spirals around the chamber in a horizontal plane, a second part thereof circles downwardly at an incline, and a third and final portion spirals in a horizontal plane within said chamber, the passage gradually opening into the chamber at a point intermediate its extent, from zero opening to full extent at the terminal end of said passage, and in gradually decreasing depth to zero depth in said final portion of its extent whereby to maintain the heavier mineral content in said passage over a substantial portion of its travel therein while discharging lighter foreign material continuously from its point of opening to its point of termination, said heavier mineral concentrate being caused to discharge from said passage in its portion of final extent as its depth decreases and at a level below the first point of entry of said sludge to said chamber.

The invention also includes other features, all of which will be clearly understood by reference to the following detailed specification taken in conjunction with the accompanying drawings.

In the drawings:

Fig. 1 is a longitudinal section taken through a preferred form of apparatus according to the present invention.

Fig. 2 is a transverse section taken along the lines 2—2 of Fig. 1.

Fig. 3 is a transverse section taken along the lines 3—3 of Fig. 1.

Figure 4:
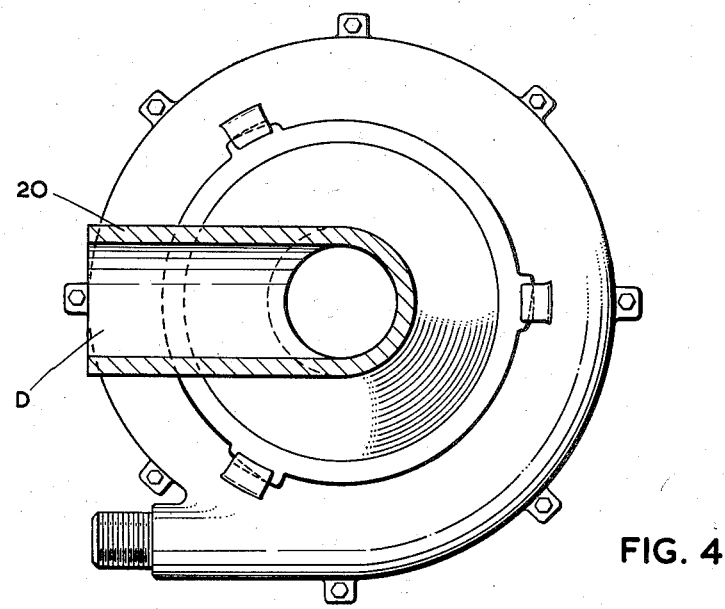
Fig. 4 is a section taken substantially along the lines 4—4 of Fig. 1.
Figure 5:
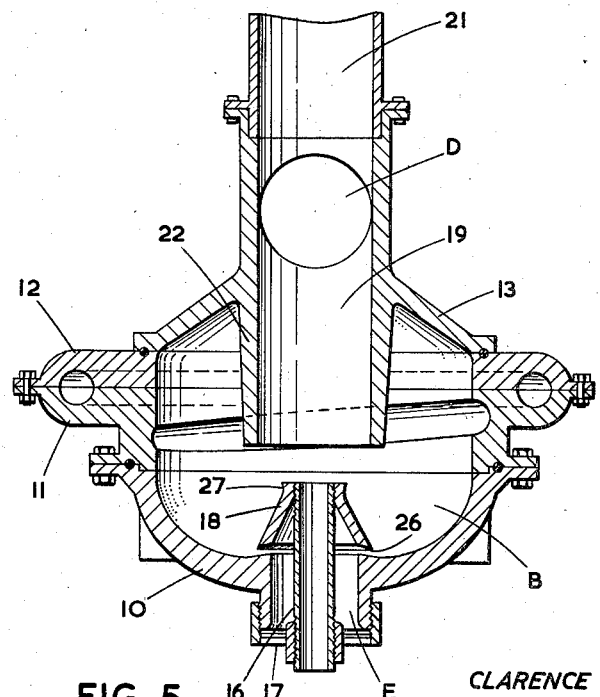
Fig. 5 is a fragmentary section taken through the injector and concentrating bowl substantially at right angles to the section shown in Fig. 1 further to illustrate the arrangement of the injector passage.

Referring to the drawings, A indicates the concentrating and separating apparatus as a whole which generally includes a concentrating chamber B, an injector C, a tailings discharge D, and a concentrate discharge E. The concentrating chamber B is based by a bowl 10, to which is detachably secured the injector body 11 preferably formed in two parts having an upper detachable head 12 and to which is detachably secured the head 13 which carries the tailings discharge. The head 13 may be detachably secured in any suitable manner such as by the clamping heads 14 with which lugs 15 on head 13 may be engaged or disengaged by rotational action of the head.

The concentrate discharge E is located in the base of the bowl and surrounds a central vortex air vent tube 16 which may be mounted on a suitable spider 17 in an adjustable manner and projects from the outside of the bowl 10 to a point therewithin and is designed to carry on its upper end a preferably conical concentrate splitter head 18, to be referred to more fully hereinafter. The vortex air vent tube 16 is axially aligned with the inner end 19 of the tailings discharge passage, which latter is intersected by the discharge conduit 20 disposed substantially at right angles thereto below a pressure regulating and relief tube 21 which is coextensive with the discharge passage 19. The lower end of the latter takes the form of an inwardly projecting baffle tube 22 which extends at its inner end in spaced relation to the vortex air vent 16 and terminates adjacent to the discharge of the injector C which will now be described in detail.

The injector comprises a generally spiral tubular passage 23 (see Fig. 2) which is disposed in the injector body 11 outside the circumference of the chamber B and which spirals finally to open in gradually increasing degree on the inside of the chamber B. The injector passage 23 constitutes an elongated pre-concentrating chamber and make two complete turns around the concentrating bowl. In the first instance, as shown more particularly in Fig. 1, the injector passage 23 makes approximately one and one-quarter spiralling turns around the chamber horizontally, then continues for one-half turn in a downwardly inclined direction as at 23a on the true circle of the chamber wall, and terminates in a substantially one-half spiral turn in a horizontal plane.

At a point before the passage 23 inclines downwardly, namely at point 23b (Fig. 2), the injector passage gradually opens into the concentrating chamber B from an opening of zero degrees to the full width of the diameter of passage 23 and accordingly gradually decreases in depth, from maximum diameter of the passage at zero degrees opening, namely at point 23a, to a depth of half the diameter of the passage at the point where the downward incline thereof commences, namely at point 23C (Fig. 1), and it continues at such constant depth over the inclined portion and finally decreases from a depth of one-half the diameter of the normal passage in the final horizontal portion to zero degrees when it merges with the wall of the concentrating chamber at the terminal end of the projector.

The liquid pulp mixture when pumped into the injector constitutes the driving force for the pulp mass within the concentrating chamber. The mixture is pumped to the entrance of passage 23 and in passing therethrough to the concentrating chamber, the heavier mineral particles travelling faster under centrifugal force pass to the outside of the injector wall and are subject to abrasive action as to remove from the ore in a practical way lighter sludge adhering thereto. The centrifugal action maintains the heavy mineral along the outside wall, such as indicated by the dotted lines 24, Fig. 1. In result, the heavy mineral held on the outside by centrifugal force will commence to discharge into the concentrating chamber B substantially when it reaches that part of passage 23 at the lower end of incline 23a to the terminal end of the passage, i.e. where the passage decreases in depth until merged with the wall of the chamber over the final horizontal extent of the passage. This is at a stage following preliminary separation of the mineral from the fine sludge and in result, the fine sludge is gradually released from the first opening of the passage 23 at varying levels down to the end of this passage with a minimum of turbulence so that a marked separation is achieved initially before the heavy material discharges from the injector.

The fine material separated is controlled largely by the baffle tube 22 extending down into the chamber substantially to the point of discharge of the heavier mineral due to centripetal action of this released material, which tube forms a path of flow for the fine separated sludge substantially along the wall of the baffle until it finally discharges upwardly through passage 19 at the lower end of the baffle tube 22. Meantime, the baffle tube functions to maintain the fine sludge in the concentrating chamber longer whereby to remove therefrom a maximum amount of fine material.

The heavier mineral substantially follows the path of the wall of the chamber B down into the bowl 10 and moves towards the concentrate discharge E over the curved portion of the bowl. The difference in gravity between fine silica and the heavier mineral in the bowl 10 causes the latter to travel faster and which under gravity seeks the level of the inner wall of the bowl so that in effect a travelling strata results with the heavier mineral at the bottom, a fine mineral and coarse silica just above, and fine silica above that again. In this condition, the separating material reaches the area surrounding the concentrate discharge. At this point, the bowl is slightly coned or raised, as indicated at 25, which tends to cause the separating material to rise slightly and towards the splitting edge 26 of the substantially conical concentrate splitter 18. In effect, therefore, the separated mineral will be caused to discharge through the concentrate discharge E with the splitting edge 26 in effect separating the strata whereas the upwardly sloped exterior wall of the splitter tends to induce an upward lifting of the finer particles so that coarse silica will tend to move upwardly from the finer mineral in the theoretical second strata of the moving mass so that a maximum recovery of mineral is achieved. In this connection, as indicated in Fig. 1, the tube 16 is adjustably mounted whereas the separating head 18 may also be adjustably mounted on the tube. In result, therefore, a fine vertical adjustment of the separating and splitting head 18 may be achieved in effect to obtain maximum separation of the concentrate from the fine sludge according to the character of the material and the operation being carried out. The conical separating head 18 is provided at its upper extremity with a slightly outward flare 27 to give the upwardly moving fluid an outward movement at this point to offset any tendency for it to spill over the top thereof into the vortex air vent tube 16.

The baffle tube 22 may be made of greater length than that shown to space it more closely to the separating head 18 to increase the vortex lift and thus tend to lift a greater proportion of the coarser particles from the sludge in the area adjacent to the head 18. Alternatively, by employing an annular sleeve closed at its lower end to fit over the lower end of the baffle tube 22 like a collar with orifices in the sleeve vertically spaced for the passage of suitable bolts or screws through to orifices in the baffle tube, a means is thus provided for varying the length of the baffle tube.

The separating head 18 though preferably of substantially conical form may be varied to some extent, the salient feature being the splitting edge, adjustable so as to split as described the foreign material from the mineral concentrate. This apparatus has been most successful in achieving a high mineral recovery. For example, in one processing operation wherein the feed thereto included 34% iron and 54% silica, the resulting recovery gave a concentrate of 59.08% with a silica content of 9.5%, the fine tailings from this processing being analyzed at 23% iron and 60% silica.

As the concentrate is obtained and discharged through the concentrate discharge E, the body of fluid passes up through the tailings discharge passage 19 and is finally discharged through conduit 20 and the tailings discharge may be processed in any suitable way for further recovery of mineral and can, if desired, be made part of the feed supplied to the injector in further processing operations.

It should be understood that this concentrating and separating apparatus may be employed for de-sliming, if desired. In this instance, de-sliming may be carried out merely by reducing the velocity of flow of the feed containing slime as a preliminary stage of concentrating which will have the effect of taking off the slime, leaving a residue for a second processing in said apparatus at higher velocity to effect the final mineral concentration. Accordingly, therefore, in the appended claims it will be understood that the term "concentrating" is intended to include de-sliming as well.

What I claim as my invention is:

1. Mineral concentrating and separating apparatus comprising a concentrating chamber of circular cross-section having a tailings discharge outlet in the top thereof and a concentrate discharge outlet in the bottom thereof axially aligned with one another, a vortex air inlet tube disposed in said concentrate discharge outlet and extending into said chamber, an injector for discharging mineral containing sludge into said chamber, a concentrate separating head disposed above said concentrate discharge outlet and surrounding said air inlet tube, said head being spaced from the bottom of said chamber to form a passage therebetween leading to said concentrate discharge outlet, said separating head being formed with a splitting edge adjacent said passage for separating the concentrate from said sludge at said passage.

2. Mineral concentrating and separating apparatus as claimed in claim 1 in which said separating head is vertically adjustable to vary the size of the passage and to locate said splitting edge at a predetermined level.

3. Mineral concentrating and separating apparatus as claimed in claim 1 in which the inner surface of the bottom of said chamber surrounding said concentrate discharge outlet is gradually raised towards the splitting edge of said separating head.

4. Mineral concentrating and separating apparatus comprising a concentrating chamber of circular cross-section having a centrally located tailings discharge outlet in its top and a concentrate discharge outlet in its bottom axially aligned with said tailings discharge, a vortex air inlet tube disposed in said concentrate discharge outlet, an injector for discharging mineral containing sludge into said chamber in a substantially circular path, a baffle tube surrounding said tailings discharge outlet and extending downwardly from the top of said chamber and forming a continuation of said tailings discharge outlet, said baffle tube terminating at a level adjacent to the level of discharge of said sludge in said chamber, a concentrate separating head disposed above the concentrate discharge and projecting towards said baffle tube in spaced relation thereto, said separating head surrounding said air inlet tube and being disposed in spaced relation to the bottom of said chamber and forming therewith an outlet passage leading to said concentrate discharge outlet, said head having an exterior deflecting surface designed to direct fluid sludge impinging it in a direction towards said tailings discharge outlet, said head having a splitting edge at its lower extremity for separating concentrate from said sludge.

5. Mineral concentrating and separating apparatus comprising a concentrating chamber of circular cross-section having a tailings discharge outlet in its top and a concentrate discharge outlet in its bottom, said outlets being disposed in axial alignment, an injector having a spirally disposed passage for introducing mineral containing sludge into said chamber in a substantially circular path within said chamber, an initial part of said passage spiralling around said chamber in a horizontal plane, a second and continuing portion thereof circling downwardly at an incline within the chamber, and a third and final portion thereof spiralling therein in a horizontal plane, said passage, at a point intermediate its extent, gradually opening into said chamber from zero opening to full extent at the terminal end of said passage, and gradually decreasing in depth to zero in said final portion of its extent, said mineral containing the sludge being caused to travel in a substantially circular and spiral path, retaining the heavier mineral content in said passage over a substantial portion of its extent while discharging lighter foreign material continuously from its point of opening to its point of termination, said heavier mineral concentrate being caused to discharge from said passage in its portion of final extent as its depth decreases and at a level below the first point of entry of said sludge to said chamber, a lower portion of said chamber sloping towards said concentrate discharge outlet for guiding concentrate thereto, and a vortex air inlet tube in said discharge outlet extending into said chamber.

6. Mineral concentrating and separating apparatus as claimed in claim 5 in which a separating head is included disposed to surround said vortex air inlet tube and to overlie said concentrate discharge outlet, said head being disposed in spaced relation to the bottom of said chamber to form therewith a concentrate discharge passage leading to said discharge outlet, said head having a splitting edge adjacent said passage for separating the concentrate from said sludge at the entrance to said concentrate discharge passage.

7. Mineral concentrating and separating apparatus as claimed in claim 6 in which said head is vertically adjustable to vary the size of the concentrate discharge passage and to locate said splitting edge at a predetermined level.

8. Mineral concentrating and separating apparatus comprising a concentrating chamber of circular cross-section having a tailings discharge outlet in its top and a concentrate discharge outlet in its bottom, said outlets being disposed in axial alignment, an injector having a spirally disposed passage for introducing mineral containing sludge to said chamber in a substantially circular path within said chamber, said passage, at a point intermediate of its extent, gradually opening into said chamber from zero opening to full extent at the terminal end of said passage and gradually decreasing in depth in its final extent to zero depth and merging with the interior wall of said chamber whereby to maintain the heavier mineral content within said passage during its travel over a substantial portion of the extent of said passage while discharging lighter foreign material continuously from its point of opening substantially to its point of termination and to discharge said heavier mineral content in the final extent of the passage at a level below its initial opening to the chamber, a lower portion of said chamber sloping towards said concentrate discharge outlet for guiding discharged concentrate thereto, and a vortex air inlet tube in said discharge outlet extending into said chamber.

9. In mineral concentrating and separating apparatus including a concentrating chamber having a tailings discharge outlet in the top thereof and a concentrate discharge outlet in the bottom thereof including a vortex air inlet tube disposed in said concentrate discharge outlet, an injector for discharging mineral containing sludge into said chamber in a substantially circular path including a passage gradually opening into said chamber from zero opening at an intermediate portion thereof to full extent at the terminal end of said passage and gradually decreasing in depth in its final extent to zero depth whereby to maintain the heavier mineral content within said passage during its travel over a substantial portion of the extent of said passage while discharging lighter foreign material continuously from its point of opening substantially to its point of termination and to discharge said heavier mineral content in the final extent of the passage, a lower portion of said chamber sloping towards said concentrate discharge outlet for guiding discharged concentrate thereto.

10. In mineral concentrating and separating apparatus including a concentrating chamber having a tailings discharge outlet in the top thereof and a concentrate discharge outlet in the bottom thereof including a vortex air inlet tube disposed in said concentrate discharge outlet, an injector for discharging mineral containing sludge into said chamber in a substantially spiralling path including a passage gradually opening into said chamber from zero opening at an intermediate portion thereof to full extent at the terminal end of said passage and gradually decreasing in depth in its final extent to zero depth whereby to maintain the heavier mineral content within said passage during its travel over a substantial portion of the extent of said passage while discharging lighter foreign material continuously from its point of opening substantially to its point of termination and to discharge said heavier mineral content in the final extent of the passage, a lower portion of said chamber sloping towards said concentrate discharge outlet for guiding discharged concentrate thereto.

11. In mineral concentrating and separating apparatus including a concentrating chamber having a tailings discharge outlet in the top thereof and a concentrate discharge outlet in the bottom thereof including a vortex air inlet tube disposed in said concentrate discharge outlet, an injector for discharging mineral containing sludge into said chamber in a substantially circular path including a passage spiralling downwardly therein, said passage gradually opening into said chamber from zero opening at an intermediate portion thereof to full extent at the terminal end of said passage and gradually decreasing in depth in its final extent to zero depth whereby to maintain the heavier mineral content within said passage during its travel over a substantial portion of the extent of said passage while discharging lighter foreign material continuously from its point of opening substantially to its point of termination and to discharge said heavier mineral content in the final extent of the passage at a level below its initial opening to the chamber, a lower portion of said chamber sloping towards said concentrate discharge outlet for guiding discharged concentrate thereto.

12. In mineral concentrating and separating apparatus including a concentrating chamber having a tailings discharge outlet in the top thereof and a concentrate discharge outlet in the bottom thereof including a vortex air inlet tube disposed in said concentrate discharge outlet extending into said chamber, an injector for discharging mineral containing sludge into said chamber in a substantially circular path, a concentrate separating head disposed above said concentrate discharge outlet and surrounding said air inlet tube, said head being spaced from the bottom of said chamber to form a passage therebetween leading to said concentrate discharge outlet, said separating head being formed with a splitting edge adjacent said passage for separating the concentrate from said sludge at said passage.

References Cited in the file of this patent

UNITED STATES PATENTS

| | | |
|---|---|---|
| 453,105 | Bretney | May 26, 1891 |
| 960,725 | Snyder | June 7, 1910 |

FOREIGN PATENTS

| | | |
|---|---|---|
| 919,941 | Germany | Nov. 8, 1954 |